United States Patent
Park

(10) Patent No.: US 9,052,443 B2
(45) Date of Patent: Jun. 9, 2015

(54) DISPLAY APPARATUS

(71) Applicant: Do-Ok Park, Yongin (KR)

(72) Inventor: Do-Ok Park, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 186 days.

(21) Appl. No.: 13/753,849

(22) Filed: Jan. 30, 2013

(65) Prior Publication Data

US 2014/0071537 A1    Mar. 13, 2014

(30) Foreign Application Priority Data

Sep. 10, 2012 (KR) .................. 10-2012-0100142

(51) Int. Cl.
| | |
|---|---|
| *G02B 27/00* | (2006.01) |
| *G02F 1/1333* | (2006.01) |
| *G02B 1/11* | (2006.01) |
| *G02B 7/00* | (2006.01) |
| *G02F 1/1335* | (2006.01) |
| *G02B 5/00* | (2006.01) |

(52) U.S. Cl.
CPC . *G02B 1/11* (2013.01); *G02B 5/003* (2013.01); *C09J 2203/318* (2013.01); *G02B 7/00* (2013.01); *G02F 1/133512* (2013.01); *G02F 2201/503* (2013.01); *G02F 2202/28* (2013.01)

(58) Field of Classification Search
CPC ..... G02B 5/003; G02B 7/00; C09J 2203/318; G02F 1/133512; G02F 2001/133331
USPC ........... 359/237–324, 600–614; 349/58, 110; 313/238–239

See application file for complete search history.

(56) References Cited

U.S. PATENT DOCUMENTS

| | | | | |
|---|---|---|---|---|
| 6,414,781 | B1 * | 7/2002 | Saitoh ........................... | 359/245 |
| 7,495,894 | B2 * | 2/2009 | Yu et al. .................... | 361/679.21 |
| 7,557,878 | B2 * | 7/2009 | Taniguchi et al. ............ | 349/113 |
| 7,719,745 | B2 * | 5/2010 | Yamada ........................ | 359/245 |
| 8,064,013 | B2 * | 11/2011 | Nakahara et al. ............. | 349/113 |
| 8,203,778 | B2 | 6/2012 | Hong et al. | |
| 2009/0109366 | A1 * | 4/2009 | Lippey ............................ | 349/58 |
| 2009/0262275 | A1 * | 10/2009 | Kang et al. ...................... | 349/58 |
| 2011/0228378 | A1 * | 9/2011 | Hong et al. .................... | 359/296 |
| 2011/0242467 | A1 * | 10/2011 | Kim et al. ...................... | 349/113 |
| 2012/0019758 | A1 * | 1/2012 | Lee et al. ....................... | 349/137 |
| 2012/0105340 | A1 | 5/2012 | Beom et al. | |
| 2013/0273266 | A1 * | 10/2013 | Niiyama et al. ............. | 428/1.55 |

FOREIGN PATENT DOCUMENTS

| | | |
|---|---|---|
| KR | 10-2010-0112781 A | 10/2010 |
| KR | 10-2011-0105977 A | 9/2011 |
| KR | 10-2011-0111749 A | 10/2011 |
| KR | 10-2012-0044501 A | 5/2012 |
| KR | 10-2012-0058820 A | 6/2012 |

* cited by examiner

*Primary Examiner* — Thomas K Pham
*Assistant Examiner* — Nicholas Pasko
(74) *Attorney, Agent, or Firm* — Lee & Morse, P.C.

(57) ABSTRACT

A display apparatus has a display panel that includes a display area and a boundary area, a window that protects the display panel and that transmits an image that is realized in the display area, and an adhesion layer that adheres the display panel and the window. The window includes a window body with a first surface that faces the display panel and a second surface that is externally exposed, a light-shielding member that is on the first surface and that blocks the boundary area of the display panel from being externally visible, and a light-shielding member protection layer that is between the light-shielding member and the adhesion layer, and that protects the light-shielding member.

10 Claims, 4 Drawing Sheets

DISPLAY APPARATUS

CROSS-REFERENCE TO RELATED PATENT APPLICATION

This application claims priority under 35 U.S.C. §119 to Korean Patent Application No. 10-2012-0100142, filed on Sep. 10, 2012, in the Korean Intellectual Property Office, the disclosure of which is incorporated herein in its entirety by reference.

BACKGROUND

A display apparatus to display a predetermined image may be classified into one of a liquid crystal display device (LCD device), a plasma display panel device (PDP device), and an organic light-emitting display device.

SUMMARY

Embodiments may be realized by providing a display apparatus that includes a display panel having a display area and a boundary area, a window protecting the display panel and transmitting an image that is realized in the display area, and an adhesion layer adhering the display panel and the window. The window includes a window body including a first surface that faces the display panel and a second surface that is externally exposed, a light-shielding member disposed on the first surface and preventing the boundary area of the display panel from being visible, and a light-shielding member protection layer disposed between the light-shielding member and the adhesion layer and protecting the light-shielding member.

The light-shielding member protection layer may allow the adhesion layer to be delaminated without damaging the light-shielding member. Adhesion between the light-shielding member protection layer and the light-shielding member may be greater than adhesion between the light-shielding member protection layer and the adhesion layer. The light-shielding member protection layer may be formed of a material including at least one of a fluorine-based material and a carbon-based material.

The display apparatus may further include an oxide layer between the light-shielding member protection layer and the light-shielding member. The oxide layer may be formed of a material including at least one of $SiO_2$ and $TiO_2$.

The display apparatus may further include an anti-finger layer formed on the second surface of the window body. The light-shielding member protection layer and the anti-finger layer may be formed of the same material.

A size of the window body may be greater than a size of the display panel. Alternatively, a size of the window body may be equal to a size of the display panel. The light-shielding member may be a black matrix. The light-shielding member may include a light absorbing material.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
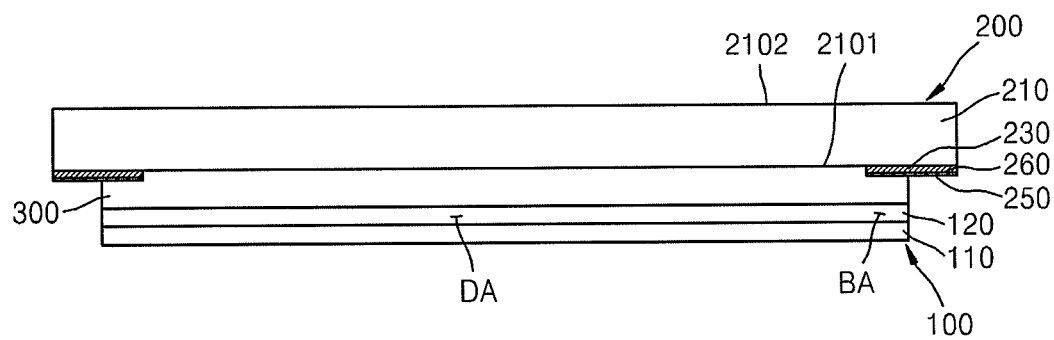
FIG. 1 is a diagram of a display apparatus according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the following description, well-known functions or constructions are not described in detail since they would obscure the embodiments with unnecessary detail, and like reference numerals in the drawings denote like or similar elements throughout the specification.

In the drawing figures, the dimensions of layers and regions may be exaggerated for clarity of illustration. Expressions such as "at least one of," when preceding a list of elements, modify the entire list of elements and do not modify the individual elements of the list.

Hereinafter, a display apparatus according to an embodiment will be described with reference to FIGS. 1 and 2. While the display apparatus according to the present embodiment indicates an organic light-emitting display device, the display apparatus according to another embodiment may indicate a liquid crystal display device (LCD device) or a plasma display panel device (PDP device), which includes a window.

FIG. 1 is a diagram of a display apparatus according to an exemplary embodiment. FIG. 2 is a magnified view illustrating a portion of the display apparatus of FIG. 1.

Figure 2:
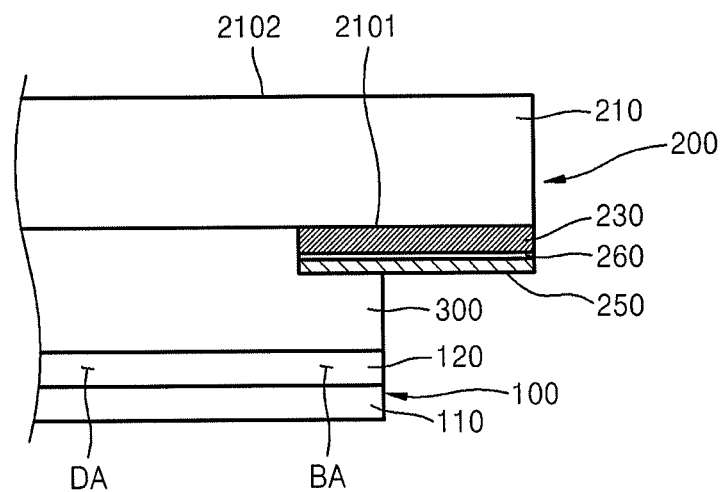
FIG. 2 is a magnified view illustrating a portion of the display apparatus of FIG. 1.

As illustrated in FIGS. 1 and 2, the display apparatus includes a display panel 100 on which an image is realized, a window 200 that protects the display panel 100 and transmits the image realized on the display panel 100, and an adhesion layer 300 that adheres the display panel 100 and the window 200 to each other. For example, the adhesion layer 300 may be directly between the display panel 100 and the window 200.

The display panel 100 includes a display area DA that displays the image, and a boundary area BA that is adjacent to the display area DA. In the present embodiment, the boundary area BA may have a shape that surrounds, e.g., completely encloses a periphery of, the display area DA. However, the shape of the boundary area BA is not limited thereto, and thus may vary.

The display panel 100 includes an organic light-emitting diode (OLED) and displays the image by using self-emission capability of the OLED. The display panel 100 includes a first substrate 110 and a second substrate 120 that face each other, and in this regard, the OLED is arranged between the first substrate 110 and the second substrate 120 that face each other. Lines are formed in one of the first substrate 110 and the second substrate 120 that face each other, and the OLED including an emission layer (EML) having the self-emission capability emits light due to the lines, so that the image is realized on the display panel 100. A polarizer (not shown) to convert an axis of light that is emitted from the display panel 100 may be attached on a front surface of the display panel 100.

The adhesion layer 300 is positioned between the display panel 100 and the window 200, and adheres the display panel 100 and the window 200. The adhesion layer 300 and the window 200 may protect the display panel 100. The adhesion layer 300 may improve shock-resistance of the display apparatus. The adhesion layer 300 may transmit the image that is realized on the display panel 100. The adhesion layer 300 may be an ultraviolet (UV) curing adhesive, an infrared (IR) curing adhesive, or a thermal curing adhesive. However, a type of the adhesion layer 300 is not limited thereto, and thus may include various types of resin capable of adhering the display panel 100 and the window 200.

The adhesion layer 300 may reduce the possibility of and/or prevent occurrence of an air gap between the display panel 100 and the window 200, and simultaneously may reduce the possibility of and/or prevent foreign substances such as dust from penetrating into a gap between the display panel 100 and the window 200. By doing so, it is possible to reduce the possibility of and/or prevent the occurrence of the air gap between the display panel 100 and the window 200. It is also possible to protect and/or prevent an image, which is displayed on the display panel 100, from being distorted by foreign substances.

The window 200 is positioned above the display panel 100 by having the adhesion layer 300 interposed therebetween. The window 200 covers the display area DA and the boundary area BA of the display panel 100. The window 200 includes a window body 210, a light-shielding member 230, and a light-shielding member protection layer 250.

The window body 210 protects the display panel 100 so as to reduce the possibility of and/or prevent the display panel 100 from being damaged by an external shock. For example, the window body 310 reduces the possibly that the display panel 100 will be damaged in the event of an external shock. The window body 210 may include a first surface 2101 that faces the display panel 100, and a second surface 2102 that is externally exposed (e.g., so as to be exposed to an outside and to be visible to a user).

The window body 210 faces the display panel 100, and covers the display area DA and the boundary area BA of the display panel 100. The window body 210 is adhered to the display panel 100 by using the adhesion layer 300 positioned between the display panel 100 and the window 200. The window body 210 and the adhesion layer 300 protect the display panel 100, so that shock-resistance of the display apparatus is improved. The window body 210 may transmit an image that is realized in the display area DA of the display panel 100. To transmit the image therethrough, the window body 210 may be formed of a transparent material such as glass or resin.

Figure 3:
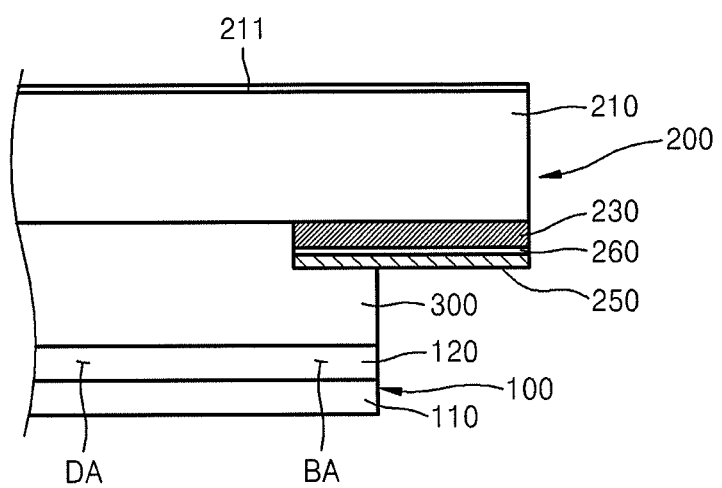
FIG. 3 is a magnified view illustrating a portion of a display apparatus according to an exemplary embodiment.

According to an exemplary embodiment, as shown in FIG. 3, an anti-finger layer 211 may be formed on the second surface 2102 of the window body 210. The anti-finger layer 211 may be formed of a material including at least one of a fluorine (F)-based material and a carbon (C)-based material.

A size of the window body 210 may be greater than a size of the display panel 100. However, the size of the window body 210 is not limited thereto and thus may vary according to a shape of the display apparatus.

Figure 4:
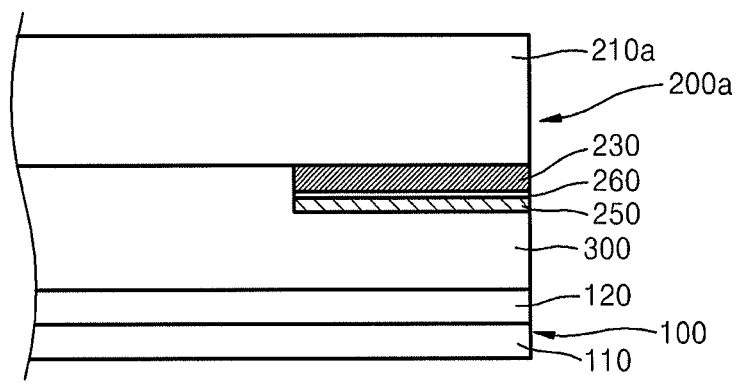
FIG. 4 is a magnified view illustrating a portion of a display apparatus according to an exemplary embodiment.

FIG. 4 is a magnified view illustrating a portion of a display apparatus according to another exemplary embodiment, and as shown in FIG. 4, a window body 210a may have substantially the same size as a size of the display panel 100. Here, the adhesion layer 300 may contact a whole surface in a direction towards the display panel 100 of the light-shielding member protection layer 250 to be described later.

The light-shielding member 230 may be disposed on the first surface 2101 of the window body 210, and may cover the boundary area BA of the display panel 100 so that the boundary area BA is not externally visible. Also, although not illustrated, the light-shielding member 230 may prevent a housing member (not shown) from being visible, which housing member houses the display panel 100. The light-shielding member 230 may be a black matrix and may be formed of a light absorbing material such as chrome (Cr) or the like.

The light-shielding member protection layer 250 is disposed between the light-shielding member 230 and the adhesion layer 300, and protects the light-shielding member 230. The light-shielding member protection layer 250 is positioned on a surface of the light-shielding member 230, and allows the adhesion layer 300 to be delaminated from the light-shielding member 230 without damaging the light-shielding member 230.

To allow the adhesion layer 300 to be delaminated from the light-shielding member 230 without damaging and/or while minimizing damage to the light-shielding member 230, adhesion between the light-shielding member protection layer 250 and the light-shielding member 230 may be greater than adhesion between the light-shielding member protection layer 250 and the adhesion layer 300. By doing so, the adhesion layer 300 may be delaminated from the light-shielding member 230, and the light-shielding member protection layer 250 may not be delaminated from the light-shielding member 230.

In order to increase the adhesion between the light-shielding member 230 and the light-shielding member protection layer 250, an oxide layer 260 may be positioned between the light-shielding member 230 and the light-shielding member protection layer 250. The oxide layer 260 may be formed of a material including at least one of $SiO_2$ and $TiO_2$. Also, the light-shielding member protection layer 250 may be formed of a material including at least one of a fluorine (F)-based material and a carbon (C)-based material. The light-shielding member protection layer 250 may be formed of the same material as the anti-finger layer 211.

When the display panel 100 and the window 200 are adhered to each other, it is possible that the display panel 100 and the window 200 are adhered while the display panel 100 and the window 200 are misaligned. In this case, the display panel 100 and the window 200 are separated for a rework. When the display panel 100 and the window 200, which are adhered to each other by using the adhesion layer 300, are separated, a breakage of the light-shielding member 230 formed on the window 200 is a very important factor that decides whether or not to re-use the window 200. The re-use of the window 200 decides the manufacturing costs, e.g., being able to re-use the window 200 decreases manufacturing costs.

Figure 5:
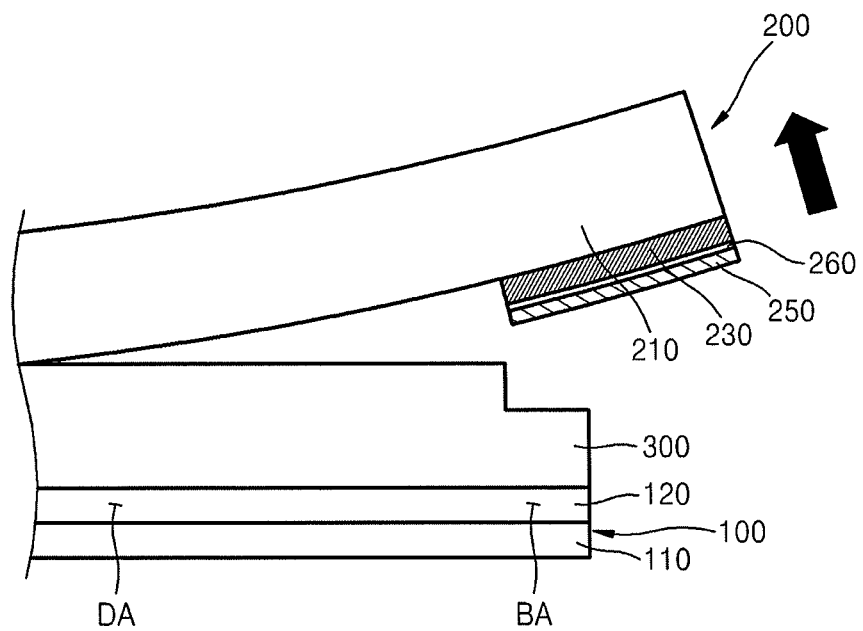
FIG. 5 is a partial cross-sectional view illustrating an exemplary process of separating a window and a display panel in the display apparatus of FIG. 1.

FIG. 5 is a partial cross-sectional view illustrating a process of separating the window 200 and the display panel 100 in the display apparatus of FIG. 1.

Referring to FIG. 5, by disposing the light-shielding member protection layer 250 on a surface of the light-shielding member 230, it is possible to reduce the possibility of and/or prevent a direct contact between the light-shielding member 230 and the adhesion layer 300. On the other hand, if the light-shielding member protection layer 250 is not arranged, while the display panel 100 and the window 200 which are adhered to each other by using the adhesion layer 300 are separated, a portion of the light-shielding member 230 that is formed on the window 200 may be torn by the adhesion layer 300, such that the window 200 may be damaged.

However, according to exemplary embodiments, when the display panel 100 and the window 200 are separated in an arrow direction shown in FIG. 5, the window 200 is separated from the display panel 100 while the light-shielding member 230 is protected by the light-shielding member protection layer 250. Therefore, the display panel 100 and the window 200 may be separated from each other without damaging the light-shielding member 230 due to the adhesion layer 300. Accordingly, the window 200 may be re-used.

The adhesion layer 300 disposed between the display panel 100 and the window 200 may externally leak. Accordingly, if the leaked adhesion layer 300 remains on the window 200, it is desirable to remove the leaked adhesion layer 300.

Figure 6:
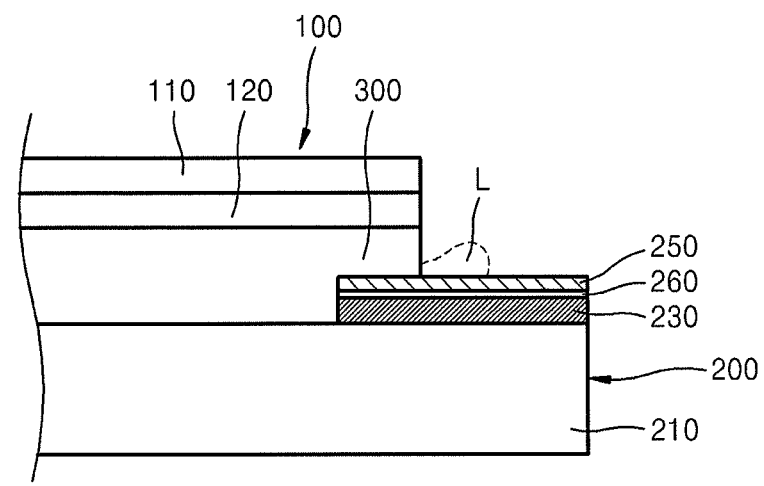
FIG. 6 is a diagram of a state in which an adhesion layer leaks in a display apparatus.

FIG. 6 is a diagram of a state in which the adhesion layer 300 leaks. Referring to FIG. 6, when the window 200 and the display panel 100 are adhered to each other in a process of manufacturing the display apparatus, the adhesion layer 300 may leak. A leaked adhesion layer L does not directly contact the light-shielding member 230 and is positioned on the light-shielding member protection layer 250.

If the light-shielding member protection layer 250 were to be excluded, the leaked adhesion layer L would directly contact the light-shielding member 230. Accordingly, it would be difficult to remove the leaked adhesion layer L that directly contacts the light-shielding member 230, e.g., due to adhesion of the leaked adhesion layer L. Further, a surface characteristic of the light-shielding member 230, or the like, could be damaged. Accordingly, a complicated and time consuming washing process would be used to clean the light-shielding member 230.

However, in the display apparatus according to exemplary embodiments, a direct contact between the light-shielding member 230 and the leaked adhesion layer L is avoided due to the light-shielding member protection layer 250 that is formed on the light-shielding member 230. Accordingly, the leaked adhesion layer L may be simply removed.

While FIG. 6 illustrates an example of the leaked adhesion layer L, foreign substances such as dust may occur in the process of manufacturing the display apparatus. In this regard, since the foreign substances may be on the light-shielding member protection layer 250, the foreign substances may be simply removed, compared to a case in which the foreign substances are on the light-shielding member 230.

The display apparatus of FIG. 1 may be variously revised. For example, while the display apparatus of FIG. 1 indicates the organic light-emitting display device, the display apparatus of FIG. 1 is not limited thereto. For example, the display apparatus may be an LCD device or a PDP device.

Figure 7:
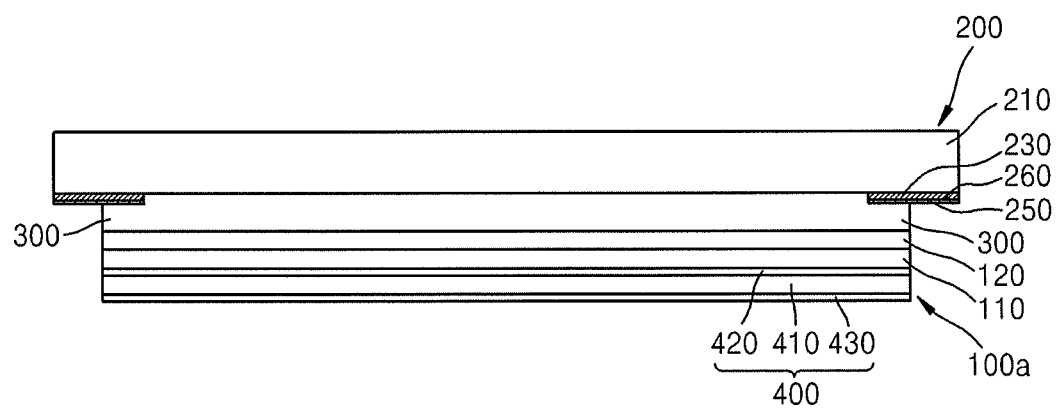
FIG. 7 is a diagram of a display apparatus according to an exemplary embodiment.

FIG. 7 is a diagram of a display apparatus according to an exemplary embodiment. In FIG. 7, the display apparatus is formed as an LCD device.

A display panel 100a includes liquid crystals, and realizes an image by using light that is emitted from a backlight unit 400 by using the liquid crystals. The display panel 100a includes a first substrate 110 and a second substrate 120 that face each other, and the liquid crystals are arranged between the first substrate 110 and the second substrate 120. Lines (not shown) are formed in the first substrate 110 and the second substrate 120 that face each other, the liquid crystals are moved by a magnetic field generated by the lines, and then an amount of light emitted from the backlight unit 400 is adjusted, so that the image is realized on the display panel 100a. A polarizer (not shown) to convert an axis of light may be attached on a surface of the display panel 100a. According to an exemplary embodiment, the backlight unit 400 includes an emission unit (not shown), a light guide plate 410, an optical sheet 420, and a reflective sheet 430. The backlight unit 400 emits light toward the first substrate 110 and the second substrate 120.

By way of summation and review, a display apparatus may include a window on a display panel so as to reduce the possibility of and/or prevent interference with respect to the display panel. Further, a light-shielding member to block and/or prevent a boundary area of the display panel from being externally visible may be formed on a surface of the window. To manufacture the display apparatus, an adhesion layer may be formed between the display panel and the window so that the display panel and the window are adhered together.

Embodiments relate to a display apparatus that includes the window. For example, embodiments relate to a display apparatus in which a rework with respect to a window having a light-shielding member formed thereon is easily performed, and foreign substances on the light-shielding member are easily removed.

According to another aspect of the embodiments, there is provided a display apparatus in which a rework is possible in a manner that a window may be re-used, in the case that the window and a display panel are adhered to each other but are misaligned. According to another aspect of the embodiments, there is provided a display apparatus in which foreign substances, e.g., a leaked adhesion layer that is formed on a light-shielding member during a manufacturing procedure of the display apparatus, may be easily removed.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A display apparatus, comprising:
   a display panel that includes a display area and a boundary area;
   a window that protects the display panel and that transmits an image that is realized in the display area; and
   an adhesion layer that adheres the display panel and the window,
   wherein the window includes:
   a window body with a first surface that faces the display panel,
   a light-shielding member that is on the first surface and that blocks the boundary area of the display panel from being externally visible, and
   a light-shielding member protection layer that is between the light-shielding member and the adhesion layer, and that protects the light-shielding member,
   wherein an adhesion between the light-shielding member protection layer and the light-shielding member is greater than an adhesion between the light-shielding member protection layer and the adhesion layer.

2. The display apparatus of claim 1, wherein the light-shielding member protection layer is formed of a material that includes at least one of a fluorine-based material and a carbon-based material.

3. The display apparatus of claim 1, wherein the window includes an oxide layer between the light-shielding member protection layer and the light-shielding member.

4. The display apparatus of claim 1, wherein the window includes a layer including at least one of a fluorine (F)-based material and a carbon (C)-based material on a second surface of the window body opposite the first surface.

5. The display apparatus of claim 1, wherein a size of the window body is greater than a size of the display panel.

6. The display apparatus of claim 1, wherein a size of the window body is equal to a size of the display panel.

7. The display apparatus of claim 1, wherein the light-shielding member is a black matrix.

8. The display apparatus of claim 3, wherein the oxide layer is formed of a material that includes at least one of $SiO_2$ and $TiO_2$.

9. The display apparatus of claim 4, wherein the light-shielding member protection layer and the layer including at least one of a fluorine (F)-based material and a carbon (C)-based material are formed of the same material.

10. The display apparatus of claim 7, wherein the light-shielding member includes a light absorbing material.

* * * * *